(12) United States Patent
Fink et al.

(10) Patent No.: US 10,287,769 B2
(45) Date of Patent: May 14, 2019

(54) STORMWATER FILTER

(71) Applicant: Hydro International plc, Clevedon (GB)

(72) Inventors: Jeremy Fink, Portland, ME (US); Andrew Scott Anastasio, Portland, ME (US); David Andrew Scott, Portland, ME (US)

(73) Assignee: Hydro International plc, Clevedon (GB)

( * ) Notice: Subject to any disclaimer, the term of this patent is extended or adjusted under 35 U.S.C. 154(b) by 0 days.

(21) Appl. No.: 15/531,686

(22) PCT Filed: Oct. 28, 2015

(86) PCT No.: PCT/GB2015/053229
§ 371 (c)(1),
(2) Date: May 30, 2017

(87) PCT Pub. No.: WO2016/087814
PCT Pub. Date: Jun. 9, 2016

(65) Prior Publication Data
US 2017/0342698 A1 Nov. 30, 2017

Related U.S. Application Data

(60) Provisional application No. 62/087,403, filed on Dec. 4, 2014.

(51) Int. Cl.
*E03F 5/14* (2006.01)
*E03F 5/04* (2006.01)
(Continued)

(52) U.S. Cl.
CPC ............. *E03F 5/14* (2013.01); *B01D 21/003* (2013.01); *B01D 21/0012* (2013.01);
(Continued)

(58) Field of Classification Search
CPC ......... E03F 5/0403; E03F 5/0404; E03F 5/14; B01D 21/0012; B01D 21/003; B01D 29/03; B01D 29/05; B01D 35/02
(Continued)

(56) References Cited

U.S. PATENT DOCUMENTS 4,189,386 A 2/1980 Aman
5,034,122 A * 7/1991 Wiesemann ........... B01D 29/05
210/162

(Continued)

FOREIGN PATENT DOCUMENTS

CN 203701263 U 7/2014
DE 102008056041 A1 5/2010
EP 0760409 A1 3/1997

OTHER PUBLICATIONS

International Search Report far Application PCT/GB2015/053229 dated May 11, 2016.
(Continued)

*Primary Examiner* — Christopher Upton
(74) *Attorney, Agent, or Firm* — Honigman LLP

(57) ABSTRACT

A stormwater filter comprising: a vessel having an inlet and an outlet; and a screen disposed within the vessel and arranged to divide at least part of the vessel into an upper section and a lower section. The stormwater filter further comprises: a flow splitter positioned adjacent the inlet of the vessel and/or a substantially vertical screen disposed adjacent the outlet in the upper section of the vessel. The flow splitter comprises an inclined leading edge and first and second deflecting surfaces extending from the leading edge. The first and second deflecting surfaces are angled relative to one another so as to direct incoming flow laterally away from an axis between the inlet and the outlet. The vertical screen comprises first and second screen portions which are angled relative to one another. The first and second screen
(Continued)

portions are each hingedly connected to the vessel and are detachably coupled to one another at their distal ends.

17 Claims, 4 Drawing Sheets

(51) Int. Cl.
*B01D 21/00* (2006.01)
*B01D 21/02* (2006.01)
*B01D 21/24* (2006.01)

(52) U.S. Cl.
CPC ......... *B01D 21/02* (2013.01); *B01D 21/2405* (2013.01); *E03F 5/0403* (2013.01); *E03F 5/0404* (2013.01)

(58) Field of Classification Search
USPC ........ 210/162, 170.03, 418, 420, 421, 747.3
See application file for complete search history.

(56) References Cited

U.S. PATENT DOCUMENTS

| | | |
|---|---|---|
| 6,258,268 B1 | 7/2001 | Lake |
| 6,478,954 B1 * | 11/2002 | Turner, Jr. ............. B01D 35/02 210/162 |
| 8,142,666 B1 | 3/2012 | Happel |
| 8,366,923 B1 | 2/2013 | Happel |
| 8,491,797 B1 | 7/2013 | Happel |
| 2005/0045541 A1 * | 3/2005 | Williams .................. E03F 5/12 210/162 |
| 2005/0051499 A1 * | 3/2005 | Nino ...................... E03F 5/0404 210/747.3 |
| 2005/0069386 A1 | 3/2005 | Happel et al. |
| 2006/0163130 A1 | 7/2006 | Happel et al. |
| 2006/0201860 A1 | 9/2006 | Happel et al. |
| 2009/0134081 A1 * | 5/2009 | Happel ................. E03F 5/0404 210/162 |
| 2009/0166279 A1 * | 7/2009 | Happel ..................... E03F 5/14 210/170.03 |
| 2011/0000862 A1 | 1/2011 | Semba et al. |
| 2013/0068679 A1 | 3/2013 | Hannemann et al. |

OTHER PUBLICATIONS

Search Report for Application GB1500438.5 dated Aug. 18, 2015.
Search Report for Application GB1500438.5 dated Jun. 24, 2015.
Chinese Office Action for Application No. 201580065895.X dated Nov. 14, 2018.

* cited by examiner

STORMWATER FILTER

BACKGROUND

The invention relates to a stormwater filter comprising a flow splitter and/or a substantially vertical screen.

TECHNICAL FIELD

In the event of a storm, excess rain and groundwater is channeled from impervious surfaces, such as pavement, roofs and parking areas to storm drains. Debris, such as rubbish, leaves and other organic matter may be entrained in the water as it flows over the surface towards the drain. The water may also carry sediment and other associated pollutants into the drain.

A filter may be used to remove the debris and sediment from the water before it enters into lakes and retention ponds. For example, debris may be removed from the water using a filter screen which allows the water to pass therethrough along with sand, gravel and other forms of sediment. The sediment can then be removed in a sedimentation chamber.

It is, however, desirable to provide a stormwater filter which provides improved sedimentation and avoids the filter screen becoming blinded (blocked).

In accordance with an aspect of the invention there is provided a stormwater filter comprising: a vessel having an inlet and an outlet; a screen disposed within the vessel and arranged to divide at least part of the vessel into an upper chamber and a lower chamber; and a flow splitter positioned adjacent the inlet of the vessel, the flow splitter comprising an inclined leading edge and first and second deflecting surfaces extending from the leading edge; wherein the first and second deflecting surfaces are angled relative to one another so as to direct incoming flow laterally away from an axis between the inlet and the outlet.

The stormwater filter may further comprise a substantially vertical screen disposed adjacent the outlet in the upper section of the vessel.

The vertical screen may comprise first and second screen portions which are angled relative to one another.

The first and second screen portions may be each hingedly connected to the vessel and are detachably coupled to one another at their distal ends.

In accordance with another aspect of the invention there is provided a stormwater filter comprising: a vessel having an inlet and an outlet; a screen disposed within the vessel and arranged to divide at least part of the vessel into an upper section and a lower section; a substantially vertical screen disposed adjacent the outlet in the upper section of the vessel; wherein the vertical screen comprises first and second screen portions which are angled relative to one another, wherein the first and second screen portions are each hingedly connected to the vessel and are detachably coupled to one another at their distal ends.

The screen may comprise one or more removable sections which provide access to the lower chamber from the upper chamber. The first and second screen portions can be retracted so that an underlying removable section can be removed or hinged from horizontal to vertical in order to provide access to the lower chamber.

The stormwater filter may further comprise a flow splitter positioned adjacent the inlet of the vessel, the flow splitter comprising an inclined leading edge and first and second deflecting surfaces extending from the leading edge; wherein the first and second deflecting surfaces are angled relative to one another so as to direct incoming flow laterally away from an axis between the inlet and the outlet.

By deflecting the incoming water laterally away from the outlet, the flow splitter is able to prevent the incoming water from passing directly from the inlet to the outlet. This prevents short-circuiting (i.e. water flowing directly from the inlet to the outlet), thereby increasing the time that each water molecule is within the vessel and forcing the particles to interact with surfaces within the vessel so as to encourage sedimentation in the vessel of particles within the water.

The inclined leading edge prevents long stringy debris from getting wrapped around the flow splitter. The shape of the flow splitter therefore prevents ragging which can quickly lead to a blockage.

The first and second deflecting surfaces may be triangular.

The flow splitter may be tetrahedron shaped.

The flow splitter may be located between the inlet and the outlet.

The flow splitter may be located on the screen adjacent the inlet and the outlet.

The flow splitter may be positioned so that the leading edge is aligned with the axis between the inlet and the outlet.

The screen may comprise an inlet ramp which is attached to the vessel below the inlet and a horizontal screen section which extends from the inlet ramp into the vessel.

The flow splitter may be located on the inlet ramp.

A height of the horizontal screen section within the vessel may be adjustable.

The vessel may comprise a plurality of uprights which are each configured to receive the horizontal screen section in a plurality of positions to adjust the height of the horizontal screen section.

The inlet ramp and the horizontal screen section may be articulated relative to one another.

The inlet ramp may be pivotably connected to the vessel below the inlet and/or to the horizontal screen section.

The inlet ramp may be slidably connected to at least one of the vessel or the horizontal screen section so as to increase or decrease a gap formed therebetween. A cover plate may be provided over the gap.

The stormwater filter may further comprise at least one wall disposed within the vessel and dividing the lower section of the vessel into a plurality of sedimentation chambers.

For a better understanding of the invention, and to show more clearly how it may be carried into effect, reference will now be made, by way of example, to the accompanying drawings, in which:

BRIEF DESCRIPTION OF THE DRAWINGS

FIGS. 1 to 3 show a stormwater filter 2 according to an embodiment of the invention.

DETAILED DESCRIPTION OF THE DRAWINGS

Figure 1:
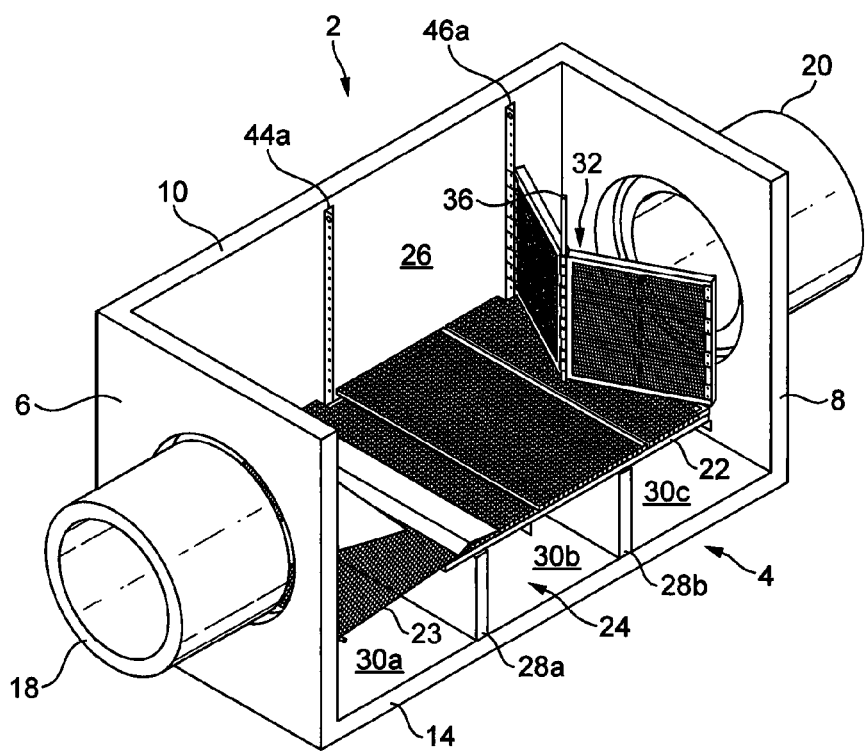
FIG. 1 is a front perspective view of a stormwater filter according to an embodiment of the invention with a side wall and an upper wall cutaway.
Figure 2:
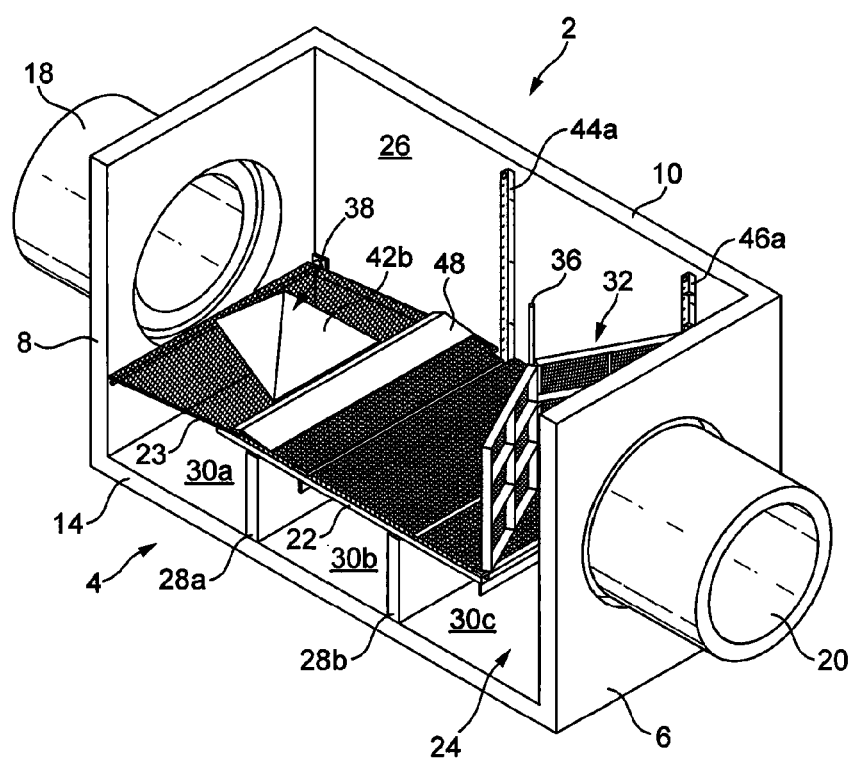
FIG. 2 is a rear perspective view of the stormwater filter with the side wall and upper wall cutaway.
Figure 3:
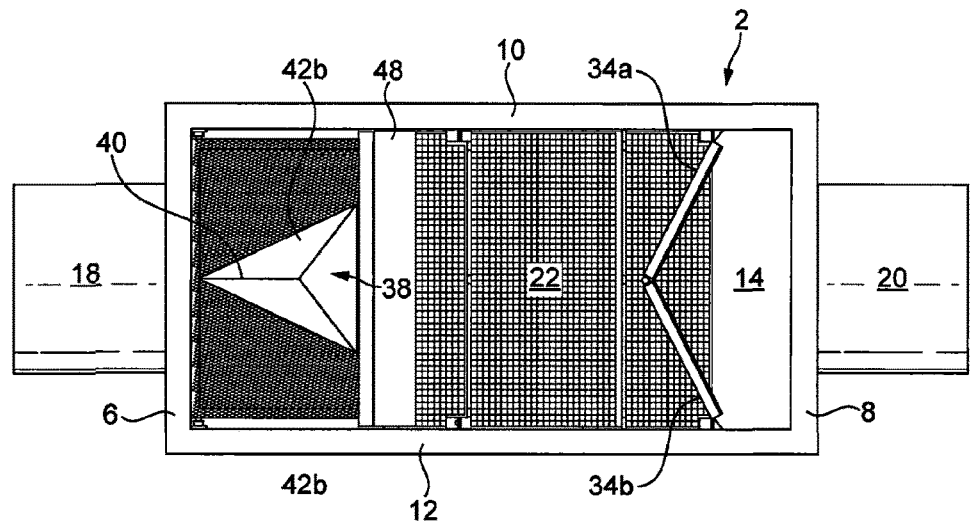
FIG. 3 is a plan view of the stormwater filter.

The stormwater filter 2 is formed generally by a cuboid vessel 4. The vessel 4 comprises a front wall 6, a rear wall 8, a left side wall 10, a right side wall 12 (see FIGS. 3 and 4), a lower wall 14 and an upper wall 16 (see FIG. 5). The vessel 4 may be a precast concrete structure.

The front wall 6 is provided with an opening which receives an inlet pipe 18 (herein, simply the "inlet"). Similarly the rear wall 8 is provided with an opening which receives an outlet pipe 20 (herein, simply the "outlet"). Alternatively, a section of the inlet 18 and the outlet 20 may be integral to the vessel 4.

A horizontal screen 22 is disposed within the vessel 4. The horizontal screen 22 extends between the left and right side walls 10, 12 and is arranged so as to be parallel to the lower wall 14. The horizontal screen 22 is connected to the front wall 6 by an inlet ramp 23 which also extends between the left and right side walls 10, 12. The inlet ramp 23 connects to the front wall 6 at a position which is below the inlet 18. The inlet ramp 23 is articulated relative to the horizontal screen 22, as will be described in detail below. The horizontal screen 22 extends from the inlet ramp 23 towards the rear wall 8, but terminates away from the rear wall 8, as shown.

The horizontal screen 22 and the inlet ramp 23 divide at least part of the vessel 4 into a lower chamber 24 and an upper chamber 26. As described previously, the inlet ramp 23 connects to the front wall 6 at a position which is below the inlet 18 such that the inlet 18 opens into the upper chamber 26. The horizontal screen 22 and the inlet ramp 23 are formed from a grate, grid or mesh which acts as a filter. The materials of the horizontal screen 22 and the inlet ramp 23 are selected to allow water and smaller debris to pass through the horizontal screen 22 and the inlet ramp 23 from the upper chamber 26 to the lower chamber 24, while larger debris is retained within the upper chamber 26.

First and second dividing walls 28a, 28b extend across the vessel 4 between the left and right side walls 10, 12 and upwards from the lower wall 14. The first and second dividing walls 28a, 28b are thus arranged so as to be parallel to the front and rear walls 6, 8. The first and second dividing walls 28a, 28b divide the lower chamber 24 into three discrete sedimentation chambers 30. Specifically, a first sedimentation chamber 30a is formed between the front wall 6 and the first dividing wall 28a, a second sedimentation chamber 30b is formed between the first dividing wall 28a and the second dividing wall 28b, and a third sedimentation chamber 30c is formed between the second dividing wall 28b and the rear wall 8.

The horizontal screen 22 may comprise one or more removable sections which provide access to the lower chamber 24 from the upper chamber 26 for maintenance. The removable sections may be hingedly connected to a portion of the remainder of the horizontal screen 22 to allow the section to be rotated from a horizontal position to a vertical position. Preferably, the removable sections provide access to each of the sedimentation chambers 30a, 30b, 30c.

Similarly, the upper wall 16 may be provided with one or more openings, such as manholes, which provide access to the interior of the vessel 4 for maintenance. Alternatively, the upper wall 16 or a portion thereof may be hingedly connected to provide access.

A vertical screen 32 extends upwards from the horizontal screen 22 in a region of the upper chamber 26 adjacent the outlet 20. The vertical screen 32 is formed by separate first and second screen portions 34a, 34b. The first screen portion 34a is hingedly connected to the left side wall 10 and the second screen portion 34b is hingedly connected to the right side wall 12. As per the horizontal screen 22 and the inlet ramp 23, the vertical screen 32 is formed from a grate, grid or mesh which acts as a filter.

Distal ends of the first and second screen portions 34a, 34b are detachably coupled to one another midway between the left and right side walls 10, 12. Specifically, the distal end of each of the first and second screen portions 34a, 34b is provided with one or more barrel portions (not specifically shown). The barrel portions of the first screen portion 34a are located at different heights to the barrel portions of the second screen portion 34b. Accordingly, the complementary barrel portions interleave or interdigitate with one another when aligned at the center of the vessel 4 such that the barrel portions align to form a continuous barrel. The barrel receives a pin 36 which interlocks the first and second screen portions 34a, 34b. The interconnection between the first and second screen portions 34a, 34b may, however, be formed in any suitable manner.

As shown, the first and second portions 34a, 34b are sized such that they are angled relative to one another when interlocked by the pin 36. Specifically, each of the first and second screen portions 34a, 34b has a length which exceeds half of the width between left and right side walls 10, 12. When interlocked with one another, the distal ends of the first and second screen portions 34a, 34b thus are located closer to the inlet 18 than the hinged ends adjacent the left and right side walls 10, 12. The vertical screen 32 therefore has a V-shaped or chevron form.

Figure 4:
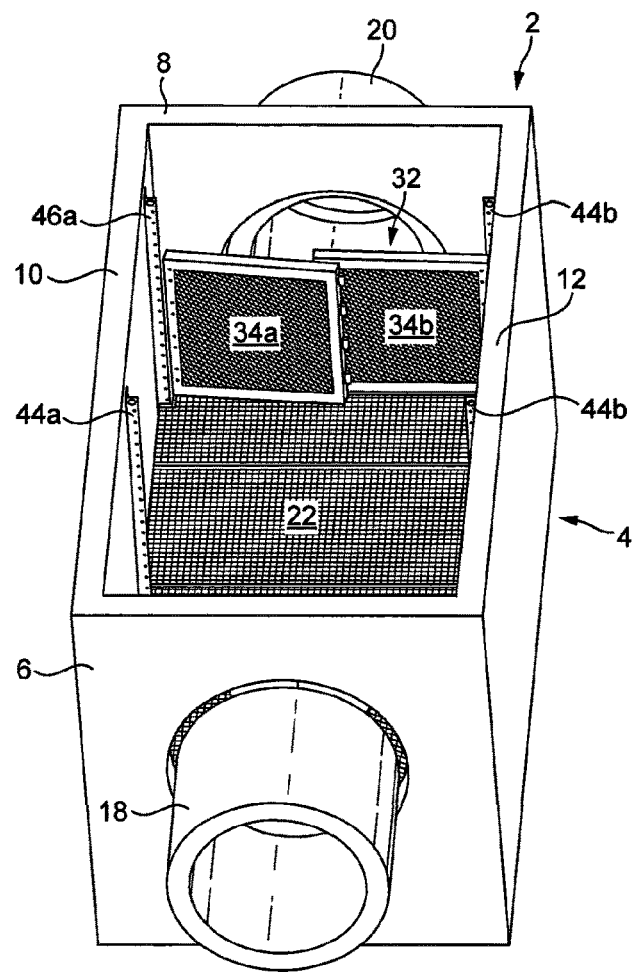
FIG. 4 is a front view of the stormwater filter showing the vertical screen in a retracted position.

As described previously, the horizontal screen 22 may comprise one or more removable sections which provide access to the lower chamber 24 from the upper chamber 26. The first and second screen portions 34a, 34b can be retracted as shown in FIG. 4 so that an underlying removable section can be removed or hinged from horizontal to vertical in order to provide access to at least the third sedimentation chamber 30c. In particular, the pin 36 can be removed from the barrel portions of the first and second screen portions 34a, 34b so that they are no longer interlocked. The first and second screen portions 34a, 34b can thus be rotated towards the outlet 20 so that they partially overlap with one another and are almost parallel to one another.

The inlet ramp 23 is provided with a flow splitter 38. The flow splitter 38 is positioned adjacent the inlet 18. The flow splitter 38 is tetrahedron shaped and is arranged such that an edge 40 of the tetrahedron is aligned with an axis extending between the inlet 18 and the outlet 20. The edge 40 thus forms a leading edge. The surfaces either side of the leading edge 40 form first and second deflecting surfaces 42a, 42b which are angled relative to one another. The leading edge 40 is inclined relative to the inlet ramp 23.

The horizontal screen 22 is connected to the left and right side walls 10, 12 of the vessel 4 via a first pair of uprights 44a, 44b respectively attached to the left and right side walls 10, 12 toward the front of the horizontal screen 22 and a second pair of uprights 46a, 46b respectively attached to the left and right side walls 10, 12 toward the rear of the horizontal screen 22. Each of the uprights 44, 46 is provided with a plurality of openings spaced along at least part of the length of the upright 44, 46. The horizontal screen 22 is connected to the uprights 44, 46 via corresponding openings using suitable fasteners, such as nuts and bolts, pins, etc. The first and second screen portions 34a, 34b of the vertical screen 32 are also connected to the uprights 46a, 46b respectively.

Figure 5:
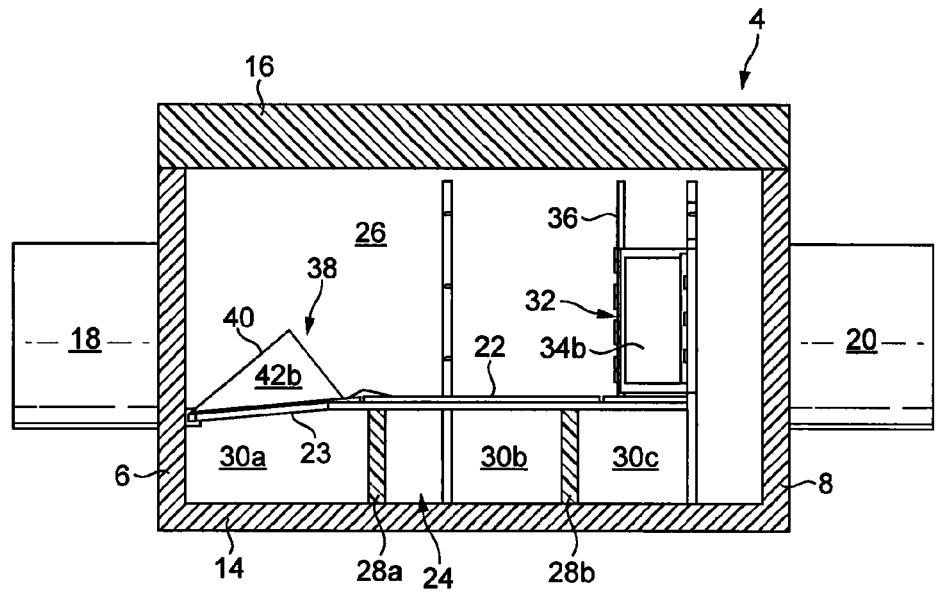
FIG. 5 is a side view of the stormwater filter with the horizontal screen in a lower position.
Figure 6:
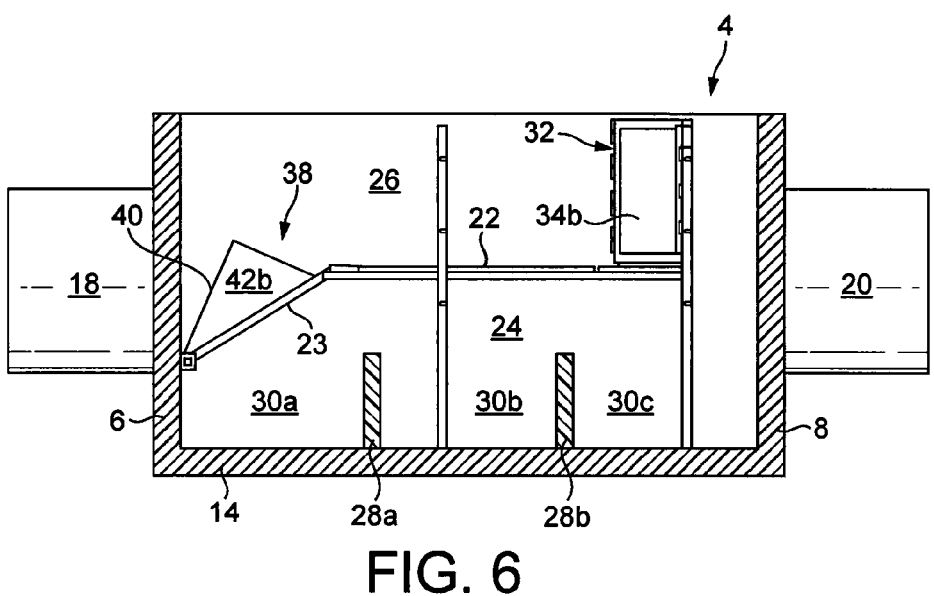
FIG. 6 is a side view of the stormwater filter with the horizontal screen in an upper position.

As shown in FIGS. 5 and 6, the height of the horizontal screen 22 (and the vertical screen 32) above the lower wall 14 can be adjusted by affixing the horizontal screen 22 to appropriately positioned openings in the uprights 44, 46.

The horizontal screen 22 can thus be moved from a lower position, as shown in FIG. 5, where the horizontal screen 22 is adjacent the dividing walls 28a, 28b, to an upper position, as shown in FIG. 6, where the horizontal screen 22 is spaced upward from the dividing walls 28a, 28b. The horizontal screen 22 may be provided with anchor points which allow it to be connected to a suitable hoist for raising and lowering the horizontal screen 22.

As described previously, the inlet ramp 23 is articulated relative to the horizontal screen 22, which allows for adjustment of the position of the horizontal screen 22. The inlet ramp 23 is pivotably connected to the front wall 6 of the vessel 4 to allow the angle of the inlet ramp 23 to vary as the height of the horizontal screen 22 is adjusted. Similarly, the inlet ramp 23 is pivotably connected to the horizontal screen 22.

As the height of the horizontal screen 22 is adjusted, the distance between the horizontal screen 22 and the position at which the inlet ramp 23 is pivotably connected to the front wall 6 also changes. To allow for this, a sliding connection between the inlet ramp 23 and the horizontal screen 22 is employed. Thus, as the height of the horizontal screen 22 increases, the connection between the inlet ramp 23 and the horizontal screen translates towards the front of the horizontal screen 22. Conversely, as the height of the horizontal screen 22 decreases, the connection between the inlet ramp 23 and the horizontal screen translates further along the horizontal screen 22 towards the rear of the horizontal screen 22.

A cover plate 48 is disposed over the sliding connection between the inlet ramp 23 and the horizontal screen 22. The cover plate 48 extends sufficiently in order to cover any gap formed between the inlet ramp 23 and the horizontal screen 22 when the horizontal screen 22 is in its uppermost position. The cover plate 48 thus prevents debris from passing between the inlet ramp 23 and the horizontal screen 22 and into the lower chamber 24. Although the cover plate 48 is shown as a solid plate, it may also be formed of a screen material, as per the inlet ramp 23 and the horizontal screen 22.

It will be appreciated that the sliding connection could instead (or in addition) be formed between the inlet ramp 23 and the front wall 6, and the cover plate 48 provided therebetween. Alternatively, the horizontal screen 22 may translate within the vessel 4 so as to obviate the need for a sliding connection.

In use, the stormwater filter 2 is installed in-line along a stormwater drain. The drain receives surface runoff in the event of a storm. Debris such as rubbish, leaves and other organic matter, and sediment such as gravel, grit and sand may be washed into the drain by the water.

The water, with entrained debris and sediment, flows through the drain to the stormwater filter 2. The water enters the upper chamber 26 of the vessel 4 via the inlet 18. As the water enters the vessel 4, it contacts the flow splitter 38 located on the inlet ramp 23. The first and second deflecting surfaces 42a, 42b of the flow splitter 38 deflect the incoming water laterally towards the left and right side walls 10, 12 of the vessel 4 and away from the outlet 20. The flow splitter 38 thus prevents the incoming water from passing directly from the inlet 18 to the outlet 20. This minimizes short-circuiting, thereby increasing the time that each water molecule is within the vessel 4 and forcing the particles to interact with surfaces within the vessel 4 so as to encourage sedimentation of the particles within the water.

As described previously, the leading edge 40 of the flow splitter 38 is inclined. This arrangement prevents any long stringy debris getting wrapped around the flow splitter 38. The shape of the flow splitter 38 therefore prevents ragging which can quickly lead to a blockage.

The material of the inlet ramp 23 and the horizontal screen 22 is selected to prevent large debris, particularly leaves and other organic matter, from passing from the upper chamber 26 to the lower chamber 24.

Owing to its incline, the inlet ramp 23 allows a portion of the incoming flow to pass under the horizontal screen 22, but directs all debris up and onto the horizontal screen 22. The vertical screen 32 retains the debris within the upper chamber 26 such that the debris accumulates in the upper chamber 26 on the horizontal screen 22 or on the vertical screen 32.

As the water passes from the inlet 18 towards the outlet 20, sediment settles toward the lower wall 14 under gravity. The sediment settles against the first and second dividing walls 28a, 28b which prevent the sediment from becoming re-entrained in the water and passing to the outlet 20.

The stormwater filter 2 thus has dual functionality in that it separates large debris from the flow which is retained in the upper chamber 26 and separates sediment which accumulates in the lower chamber 24.

As the first and second screen portions 34a, 34b are angled relative to the incoming flow, the flow acts to scour debris and sediment off the first and second screen portions 34a, 34b and force them towards the corners of the vessel 4. This therefore prevents the vertical screen 32 from becoming blinded. The position of the vertical screen 32 adjacent the outlet 20 also maximizes the opportunity for material to settle on the horizontal screen 22 such that less material reaches the vertical screen 32. This again, prevents the vertical screen 32 from becoming blinded.

The height of the horizontal screen 22 is set such that between storm events the accumulated debris is kept above the level of water in the vessel 4 and thus remains dry. This prevents the debris, particularly organic matter, from decomposing and releasing nutrients into the stagnant water. Therefore, if the ground water level is too high and the horizontal screen is submerged between storm events, it can be raised to a higher position on the uprights 44, 46.

As described previously, access to the interior of the vessel 4 is provided through the upper wall 16. This allows debris to be periodically removed from the upper chamber 26. The lower chamber 24 can also be accessed through the removable sections of the horizontal screen 22. As described previously, the first and second screen portions 34a, 34b can be retracted so that the underlying removable section can be removed or hinged from horizontal to vertical in order to provide access to the lower chamber 24. The debris and/or sediment can be removed from the vessel 4 using a suitable vacuum tanker or the like.

In other embodiments, the inlet 18 may be perpendicular to be the outlet 20. The inlet 18 may also be embodied as a grate located at the surface. The stormwater filter 2 may receive water from a number of sources and thus be provided with a plurality of inlets.

Although the flow splitter 38 has been described as being tetrahedron shaped, this is not necessary. In particular, the first and second deflecting surfaces 42a, 42b need not be triangular. The first and second deflecting surfaces 42a, 42b simply need to diverge away from one another from the leading edge 40, which itself must be inclined. The leading edge 40 is inclined such that it remains inclined (i.e. not vertical) even when the horizontal screen 22 is in its highest position. The flow splitter 38 also need not be located within the vessel 4 itself and could instead be positioned within the inlet 18.

Although the vessel 4 has been described as having first and second dividing walls 28a, 28b, it will be appreciated that any number of dividing walls may be provided. Further, in certain applications, it may not be necessary to provide any dividing walls.

In certain applications, the flow splitter 38 may be used without the horizontal and vertical screens 22, 32. Likewise, the horizontal and vertical screens 22, 32 may be used without the flow splitter 38.

Although the horizontal and vertical screens 22, 32 have been described as extending between the side walls of the chamber, they may instead be spaced from the side walls of the vessel and screen side walls provided to form a free-standing basket within the vessel. This may allow the basket to be more easily removed for maintenance.

The invention is not limited to the embodiments described herein, and may be modified or adapted without departing from the scope of the present invention.

The invention claimed is:

1. A stormwater filter comprising:
    a vessel having an inlet and an outlet;
    a first screen disposed within the vessel and arranged to divide at least part of the vessel into an upper section and a lower section;
    a substantially vertical screen disposed adjacent the outlet in the upper section of the vessel;
    wherein the vertical screen comprises first and second screen portions which are angled relative to one another, wherein the first and second screen portions are each hingedly connected to the vessel and are detachably coupled to one another at their distal ends.

2. A stormwater filter as claimed in claim 1, further including a flow splitter positioned adjacent the inlet of the vessel, the flow splitter including an inclined leading edge and first and second deflecting surfaces extending from the leading edge; wherein the first and second deflecting surfaces are angled relative to one another so as to direct incoming flow laterally away from an axis between the inlet and the outlet.

3. A stormwater filter as claimed in claim 2, wherein the first and second deflecting surfaces are triangular.

4. A stormwater filter as claimed in claim 2, wherein the flow splitter is tetrahedron shaped.

5. A stormwater filter as claimed in claim 2, wherein the flow splitter is located between the inlet and the outlet.

6. A stormwater filter as claimed in claim 2, wherein the flow splitter is located on the first screen adjacent to the inlet.

7. A stormwater filter as claimed in claim 2, wherein the flow splitter is positioned so that the leading edge is aligned with the axis between the inlet and the outlet.

8. A stormwater filter as claimed in claim 1, wherein the first screen includes an inlet ramp which is attached to the vessel below the inlet and a horizontal screen section which extends from the inlet ramp into the vessel.

9. A stormwater filter as claimed in claim 8, wherein a flow splitter is located on the inlet ramp.

10. A stormwater filter as claimed in claim 8, wherein a height of the horizontal screen section within the vessel is adjustable.

11. A stormwater filter as claimed in claim 10, wherein the vessel includes a plurality of uprights which are each configured to receive the horizontal screen section in a plurality of positions to adjust the height of the horizontal screen section.

12. A stormwater filter as claimed in claim 8, wherein the inlet ramp and the horizontal screen section are articulated relative to one another.

13. A stormwater filter as claimed in claim 12, wherein the inlet ramp is pivotably connected to the vessel below the inlet.

14. A stormwater filter as claimed in claim 12, wherein the inlet ramp is pivotably connected to the horizontal screen section.

15. A stormwater filter as claimed in claim 12, wherein the inlet ramp is slidably connected to at least one of the vessel or the horizontal screen section so as to increase or decrease a gap formed therebetween.

16. A stormwater filter as claimed in claim 15, wherein a cover plate is provided over the gap.

17. A stormwater filter as claimed in claim 1, further comprising at least one wall disposed within the vessel and dividing the lower section of the vessel into a plurality of sedimentation chambers.

* * * * *